United States Patent
Kashiwagi

(10) Patent No.: US 10,704,922 B2
(45) Date of Patent: Jul. 7, 2020

(54) ELECTRONIC DEVICE, ELECTRONIC DEVICE CONTROL METHOD, AND STORAGE MEDUIM

(71) Applicant: SHARP KABUSHIKI KAISHA, Sakai, Osaka (JP)

(72) Inventor: Tohru Kashiwagi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 377 days.

(21) Appl. No.: 15/570,141

(22) PCT Filed: Apr. 18, 2016

(86) PCT No.: PCT/JP2016/062270
§ 371 (c)(1),
(2) Date: Oct. 27, 2017

(87) PCT Pub. No.: WO2016/175079
PCT Pub. Date: Nov. 3, 2016

(65) Prior Publication Data
US 2018/0128641 A1    May 10, 2018

(30) Foreign Application Priority Data

Apr. 28, 2015 (JP) .................................. 2015-092313

(51) Int. Cl.
*G01C 22/00* (2006.01)
*G01P 13/00* (2006.01)
*G01P 15/00* (2006.01)

(52) U.S. Cl.
CPC ............ *G01C 22/006* (2013.01); *G01P 13/00* (2013.01); *G01P 15/003* (2013.01)

(58) Field of Classification Search
None
See application file for complete search history.

(56) References Cited

U.S. PATENT DOCUMENTS

| | | | |
|---|---|---|---|
| 2013/0013249 A1* | 1/2013 | Hagiwara | ............... G01P 13/00 702/141 |
| 2013/0138394 A1 | 5/2013 | Shiga | |
| 2013/0275078 A1* | 10/2013 | Tanabe | ................... A63B 24/00 702/141 |

FOREIGN PATENT DOCUMENTS

| | | | |
|---|---|---|---|
| JP | 2012-198663 A | | 10/2012 |
| JP | 2012198663 A | * | 10/2012 |
| JP | 2013-114486 A | | 6/2013 |

OTHER PUBLICATIONS

Machine Translation for JP 2012-198663.*

* cited by examiner

*Primary Examiner* — Gregory J Toatley, Jr.
*Assistant Examiner* — Terence E Stifter, Jr.
(74) *Attorney, Agent, or Firm* — ScienBiziP, P.C.

(57) ABSTRACT

In order to avoid erroneous count of the number of steps in a case where a user is using a traveling means other than walking, a step counting section (13) switches between acceleration value change period ranges for counting the number of steps, depending on whether a traveling means determining section (11) determines that the user is walking or that the user is using a traveling means other than walking.

5 Claims, 13 Drawing Sheets

| RESULT OF DETERMINING TRAVELING MEANS | ACCELERATION CHANGE PERIOD RANGE FOR COUNTING NUMBER OF STEPS |
|---|---|
| USER IS NOT RIDING IN VEHICLE (BUT WALKING) | 240~2100msec |
| USER IS RIDING IN VEHICLE | 350~650msec |

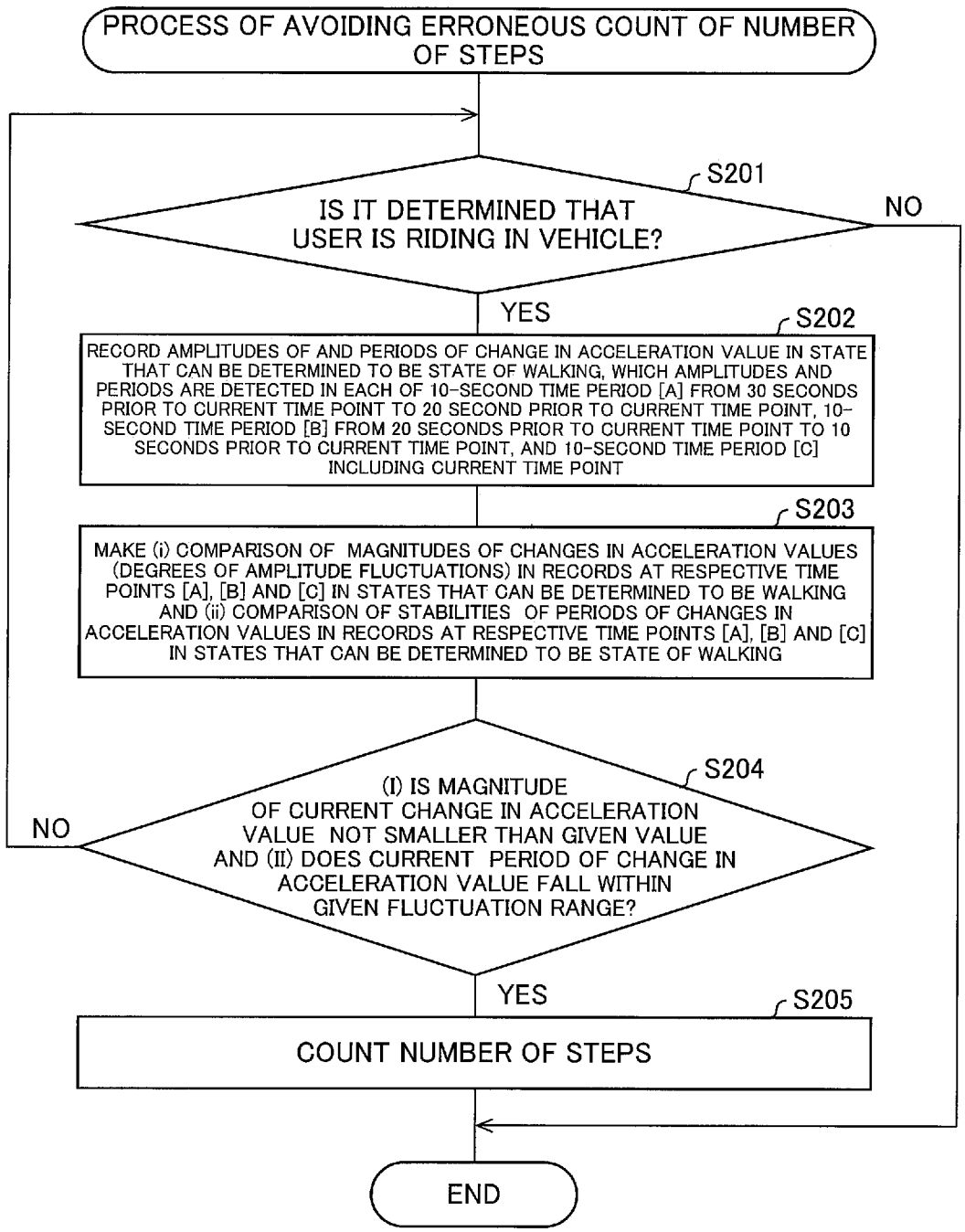

ELECTRONIC DEVICE, ELECTRONIC DEVICE CONTROL METHOD, AND STORAGE MEDUIM

TECHNICAL FIELD

The present invention relates to an electronic device which (i) determines a traveling means used by a user and (ii) counts the number of steps taken by the user while the user is walking, and a method of controlling such an electronic device.

BACKGROUND ART

Many electronic devices (such as mobile phones and smartphones in particular) each include an acceleration sensor for measuring an acceleration caused by movement or vibration of the electronic devices. Pedometers including such acceleration sensors have been widely used in recent years. However, in a case where the number of steps taken by a user while the user is walking is to be counted with use of a pedometer including an acceleration sensor, the pedometer may erroneously count the number of steps as a result of erroneously taking, as acceleration fluctuations caused by walking, acceleration fluctuations caused by a factor other than walking. For example, in a case where a user who carries a pedometer is seated in a vehicle such as a car or a train, the pedometer may erroneously count the number of steps based on, for example, (i) vibration that is caused by traveling of a car or a train or (ii) change in acceleration value that is measured when the car or the train starts running or stops.

Patent Literature 1 discloses a technique of preventing erroneous count of the number of steps in a case where a user is traveling by vehicle. According to this technique, determination on whether the user is traveling by vehicle is made based on a feature amount and then, a count of the number of steps is, for example, withheld depending on a result of the determination. Patent Literature 1 discloses a number-of-steps detecting device which includes (i) a number-of-steps detecting section for detecting the number of steps based on a sensor signal, (ii) a walking time measuring section for measuring a period of time during which the user is continuously walking (i.e., a continuous walking time period), (iii) a number-of-steps counting section for counting the number of steps based on the number of steps detected by the number-of-steps detecting section, (iv) a feature amount extracting section for extracting a feature amount based on the sensor signal, and (v) a determining section for determining, based on the feature amount, whether the user is traveling by vehicle. In a case where the continuous walking time period is shorter than a given period for determination of effective number of steps, the number-of-steps counting section resets a count of the number of steps detected during the continuous walking time period. In a case where it is determined that the user is traveling by vehicle, the number-of-steps counting section extends the given period for determination of effective number of steps.

CITATION LIST

Patent Literature

Patent Literature 1
Japanese Patent Application Publication Tokukai No. 2012-198663 (Publication Date: Oct. 18, 2012)

SUMMARY OF INVENTION

Technical Problem

However, in conventional techniques such as the one described above, it is not possible to sufficiently reduce a possibility that, in a case where a user is riding in a vehicle such as a train or a car, vibration caused by the vehicle may be erroneously detected as vibration caused by walking. This leads to a problem that it may not be possible to count the number of steps with high accuracy. For example, according to the number-of-steps counting device disclosed in Patent Literature 1, in a case where it is determined that the user is traveling by vehicle, (i) the given period for determination of effective number of steps is extended and (ii) a count of the number of steps is withheld or discarded. However, even with the above configuration arranged to extend as appropriate the period for determination of effective number of steps, it is not possible to reduce a possibility that vibration caused by a vehicle such as a train or a car may be erroneously detected as vibration caused by walking. This makes it impossible to prevent erroneous count of the number of steps at all times.

The present invention has been attained in view of the above problem, and an object of the present invention is to provide an electronic device and the like that can avoid erroneous count of the number of steps in a case where a user is traveling by using a traveling means other than walking.

Solution to Problem

In order to attain the above object, an electronic device in accordance with an aspect of the present invention includes: a determining section configured to determine whether a user is walking or using a traveling means other than walking; and a step counting section configured to count the number of steps taken by the user in a case where (i) an amplitude of change in acceleration value supplied from an acceleration sensor is not smaller than a given value and (ii) a period of the change in acceleration value falls within a given range, the step counting section switching the given range between acceleration value change period ranges for counting the number of steps, depending on whether the determining section determines that the user is walking or that the user is using a traveling means other than walking.

A method of controlling an electronic device in accordance with an aspect of the present invention includes the steps of: (a) determining whether a user is walking or using a traveling means other than walking; and (b) counting the number of steps taken by the user in a case where (i) an amplitude of change in acceleration value supplied from an acceleration sensor is not smaller than a given value and (ii) a period of the change in acceleration value falls within a given range, in the step (b), the given range being switched between acceleration value change period ranges for counting the number of steps, depending on whether it is determined in the step (a) that the user is walking or that the user is using a traveling means other than walking.

Advantageous Effects of Invention

As an effect of an aspect of the present invention, it becomes possible to avoid erroneous count of the number of steps in a case where a user is traveling by using a traveling means other than walking.

Figure 4:
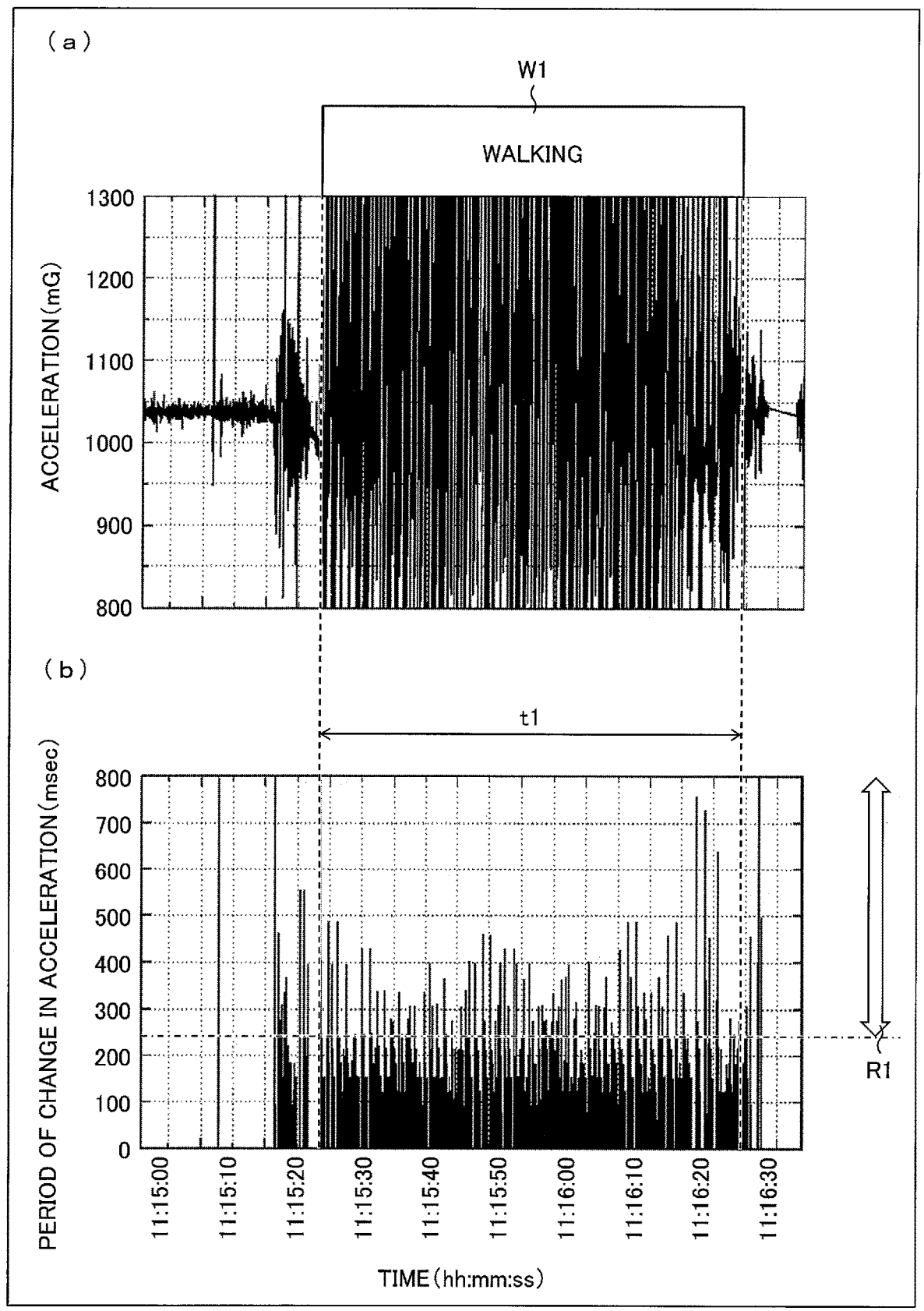

(a) of FIG. 4 is an example of a graph illustrating fluctuations of a synthetic acceleration value which is generated from acceleration values detected in a case where a user is traveling by walking. (b) of FIG. 4 is an example of a graph obtained by plotting periods of the respective fluctuations of the synthetic acceleration value illustrated in (a) of FIG. 4.

Figure 5:
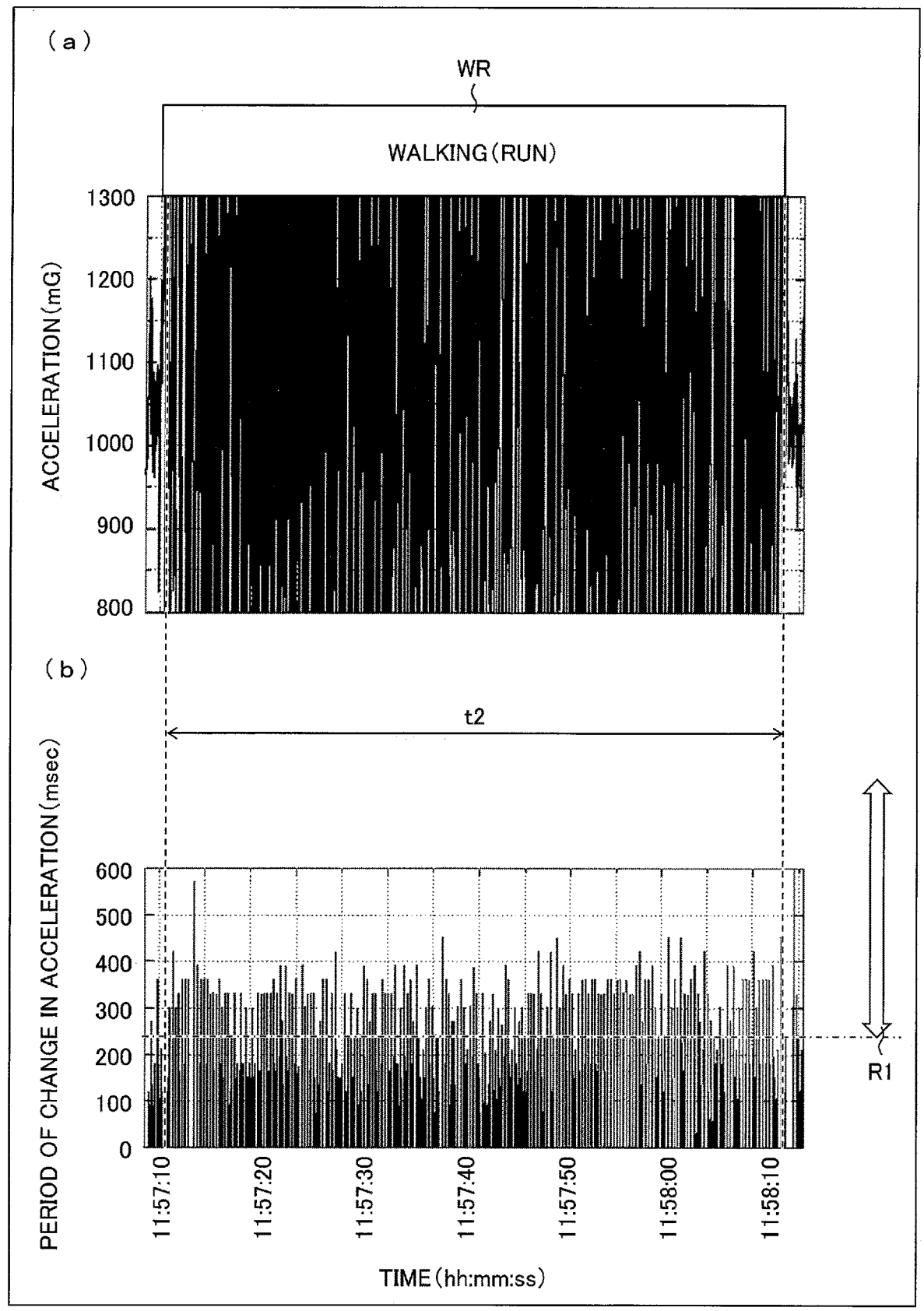

(a) of FIG. 5 is an example of a graph illustrating fluctuations of a synthetic acceleration value which is generated from acceleration values detected in a case where a user is traveling by running. (b) of FIG. 5 is an example of a graph obtained by plotting periods of the respective fluctuations of the synthetic acceleration value illustrated in (a) of FIG. 5.

Figure 6:
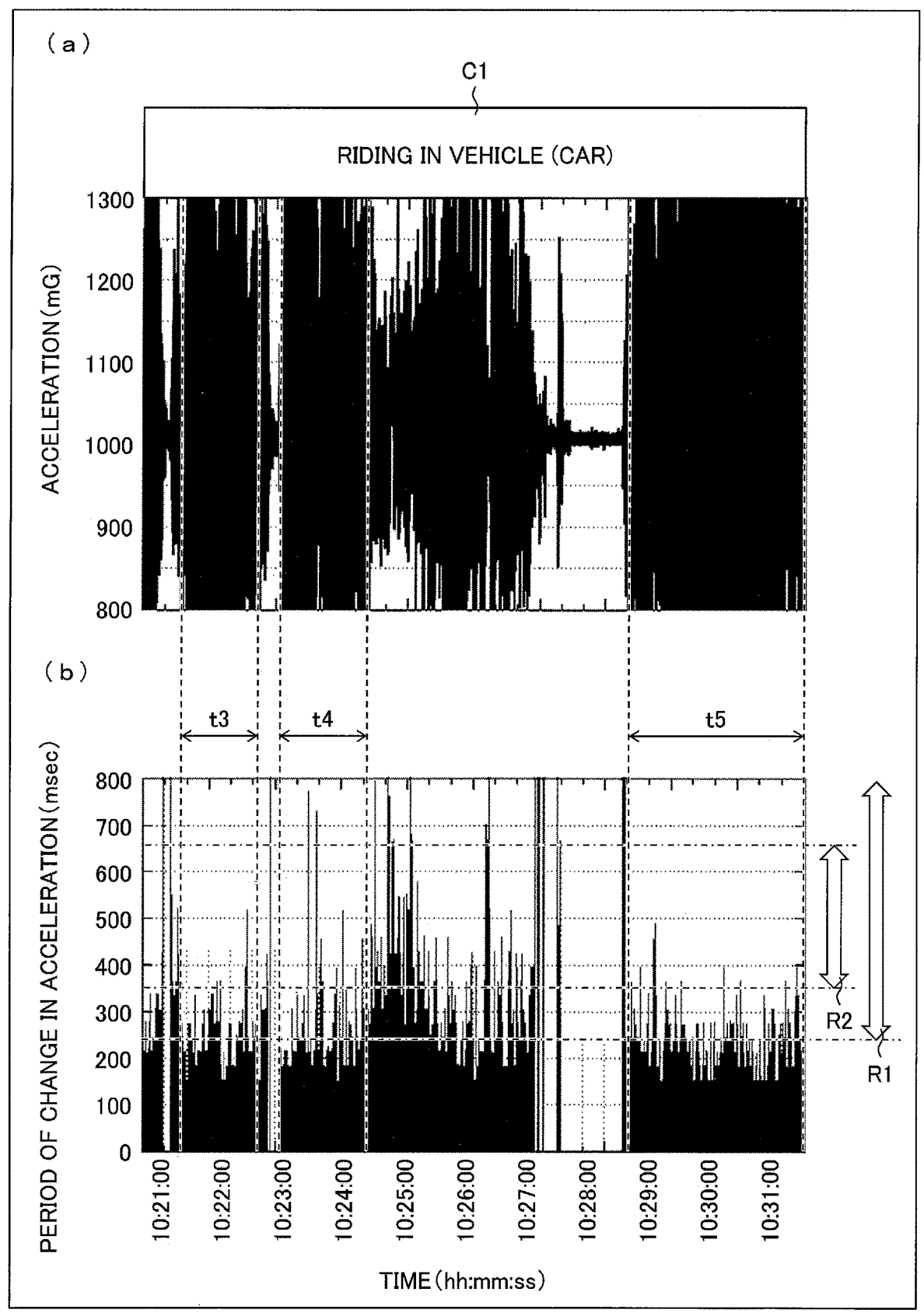

(a) of FIG. 6 is an example of a graph illustrating fluctuations of a synthetic acceleration value which is generated from acceleration values detected in a case where a user is traveling in a car. (b) of FIG. 6 is an example of a graph obtained by plotting periods of the respective fluctuations of the synthetic acceleration value illustrated in (a) of FIG. 6.

Figure 7:
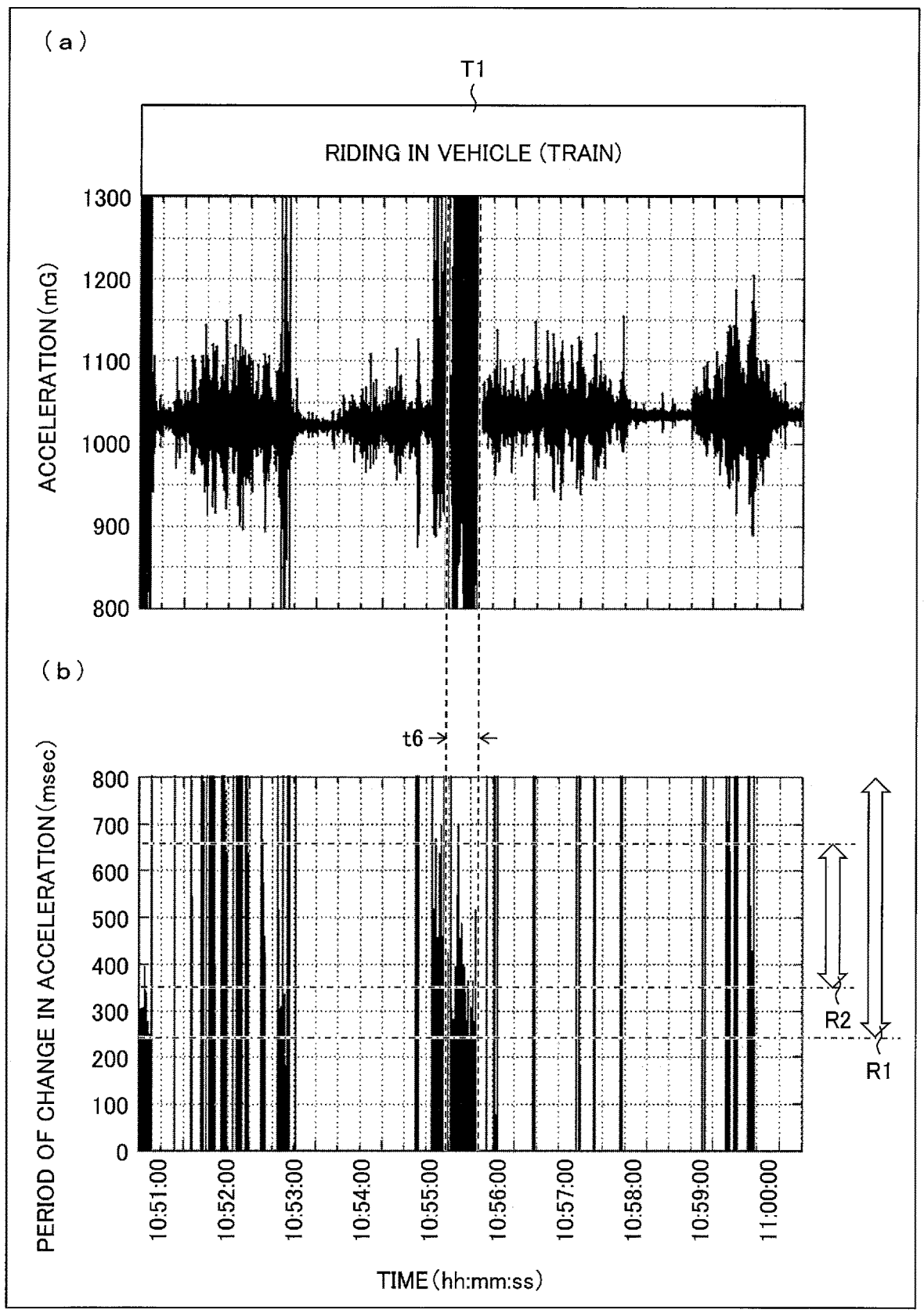

(a) of FIG. 7 is an example of a graph illustrating fluctuations of a synthetic acceleration value which is generated from acceleration values detected in a case where a user is traveling in a train. (b) of FIG. 7 is an example of a graph obtained by plotting periods of the respective fluctuations of the synthetic acceleration value illustrated in (a) of FIG. 7.

Figure 8:
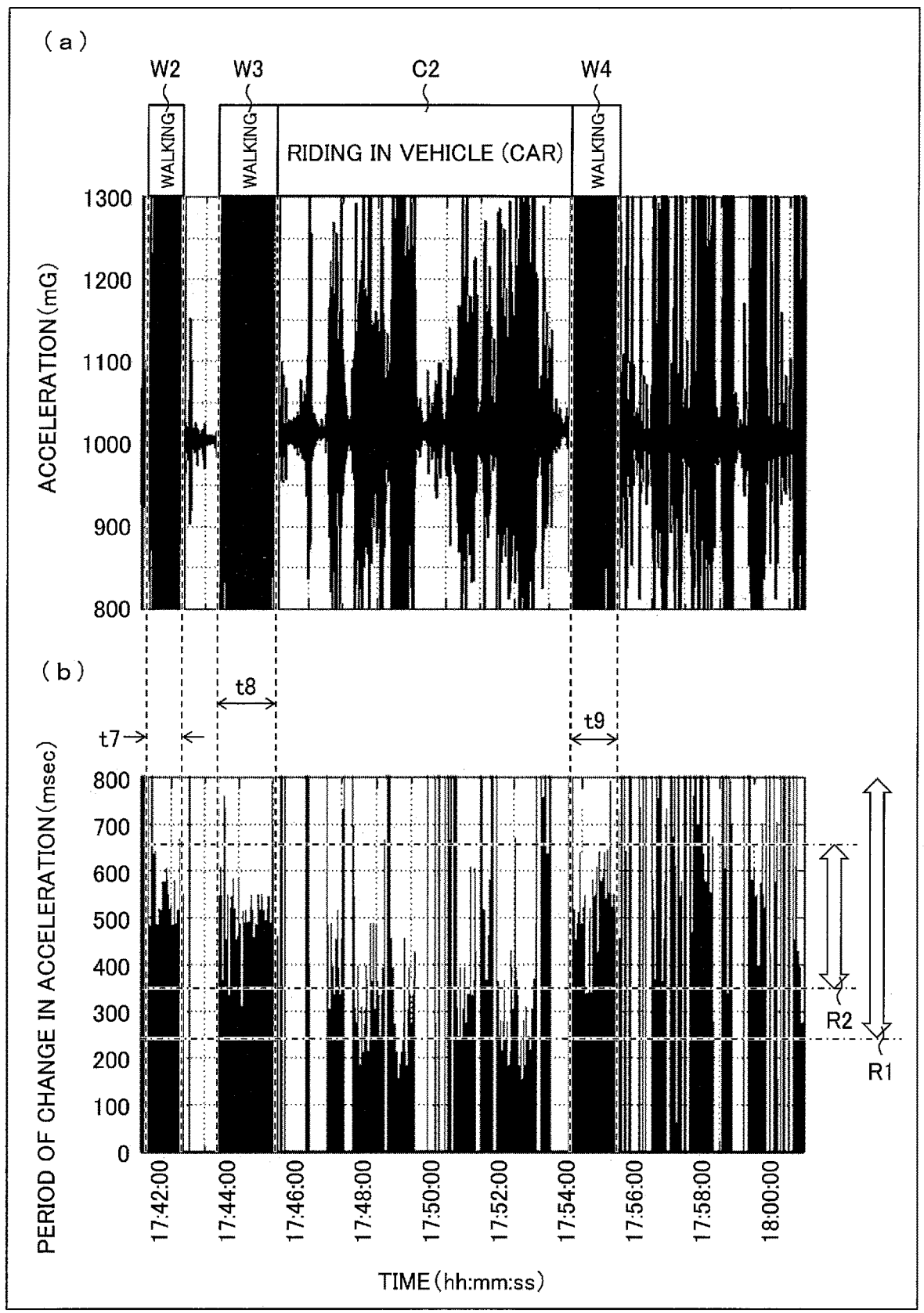

(a) of FIG. 8 is an example of a graph illustrating fluctuations of a synthetic acceleration value which is generated from acceleration values detected in a case where a user walks before and after traveling in a car. (b) of FIG. 8 is an example of a graph obtained by plotting periods of the respective fluctuations of the synthetic acceleration value illustrated in (a) of FIG. 8.

Figure 9:
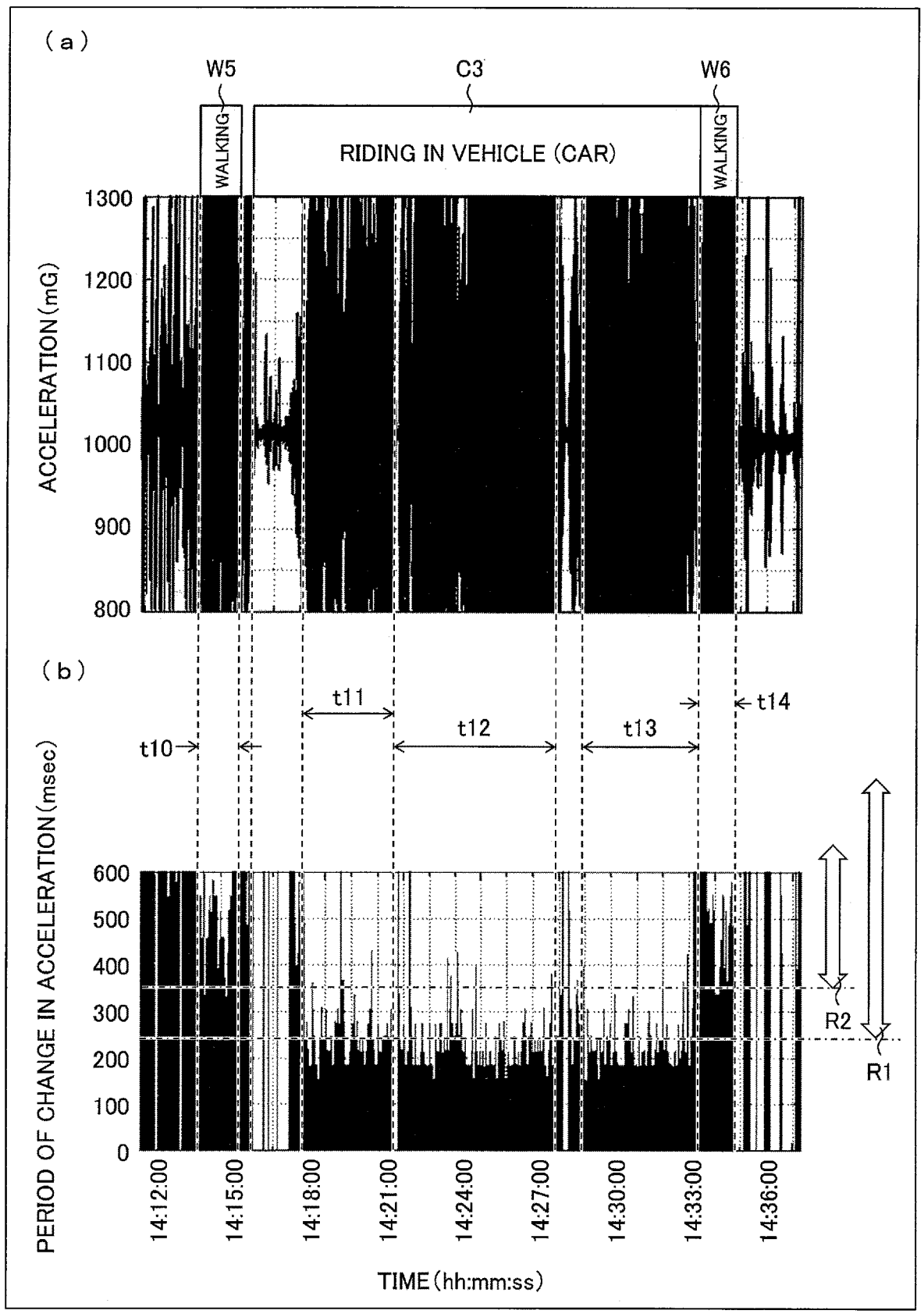

(a) of FIG. 9 is another example of a graph illustrating fluctuations of a synthetic acceleration value which is generated from acceleration values detected in a case where a user walks before and after traveling in a car. (b) of FIG. 9 is an example of a graph obtained by plotting periods of the respective fluctuations of the synthetic acceleration value illustrated in (a) of FIG. 9.

Figure 10:
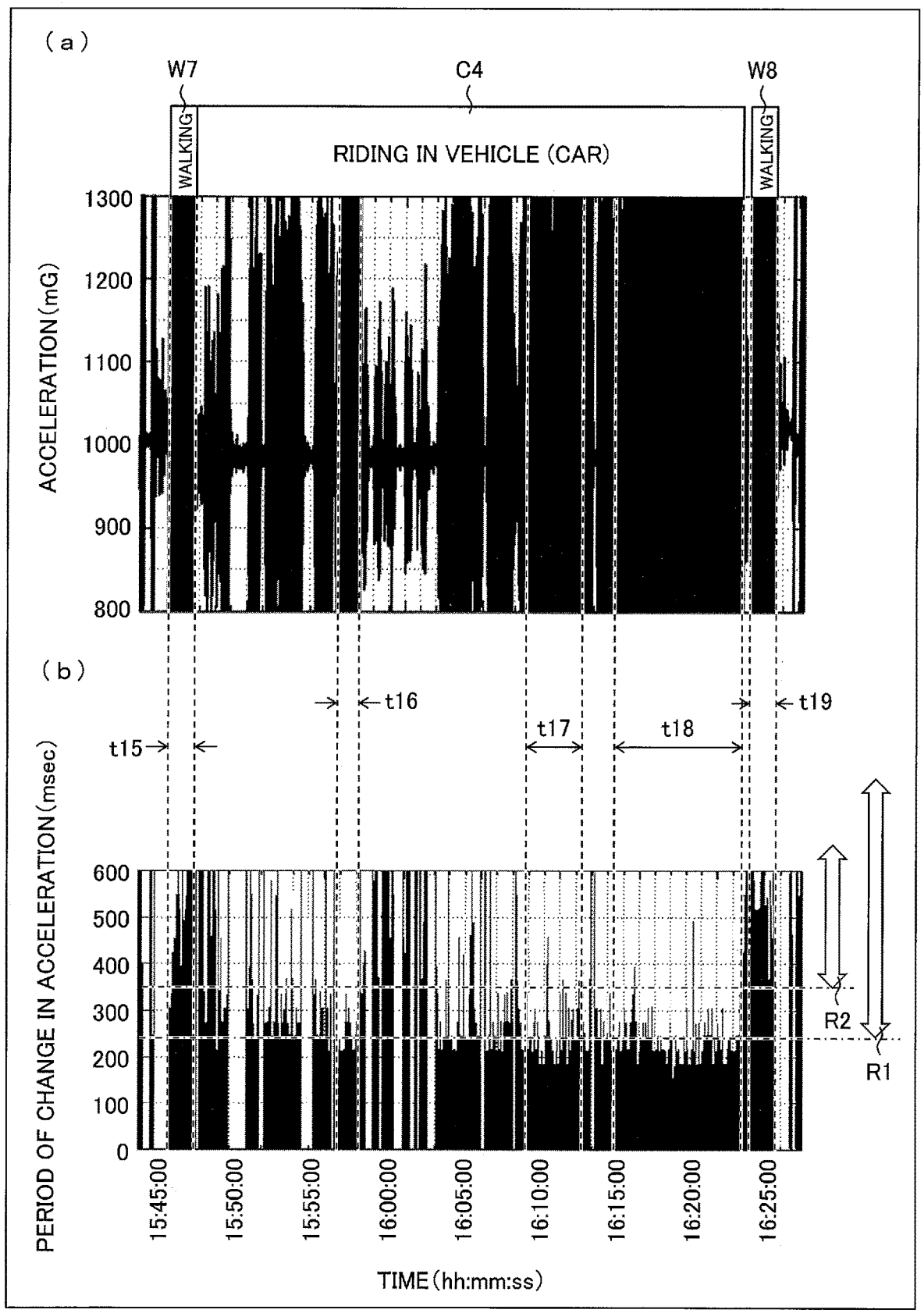

(a) of FIG. 10 is another example of a graph illustrating fluctuations of a synthetic acceleration value which is generated from acceleration values detected in a case where a user walks before and after traveling in a car. (b) of FIG. 10 is an example of a graph obtained by plotting periods of the respective fluctuations of the synthetic acceleration value illustrated in (a) of FIG. 10.

Figure 11:
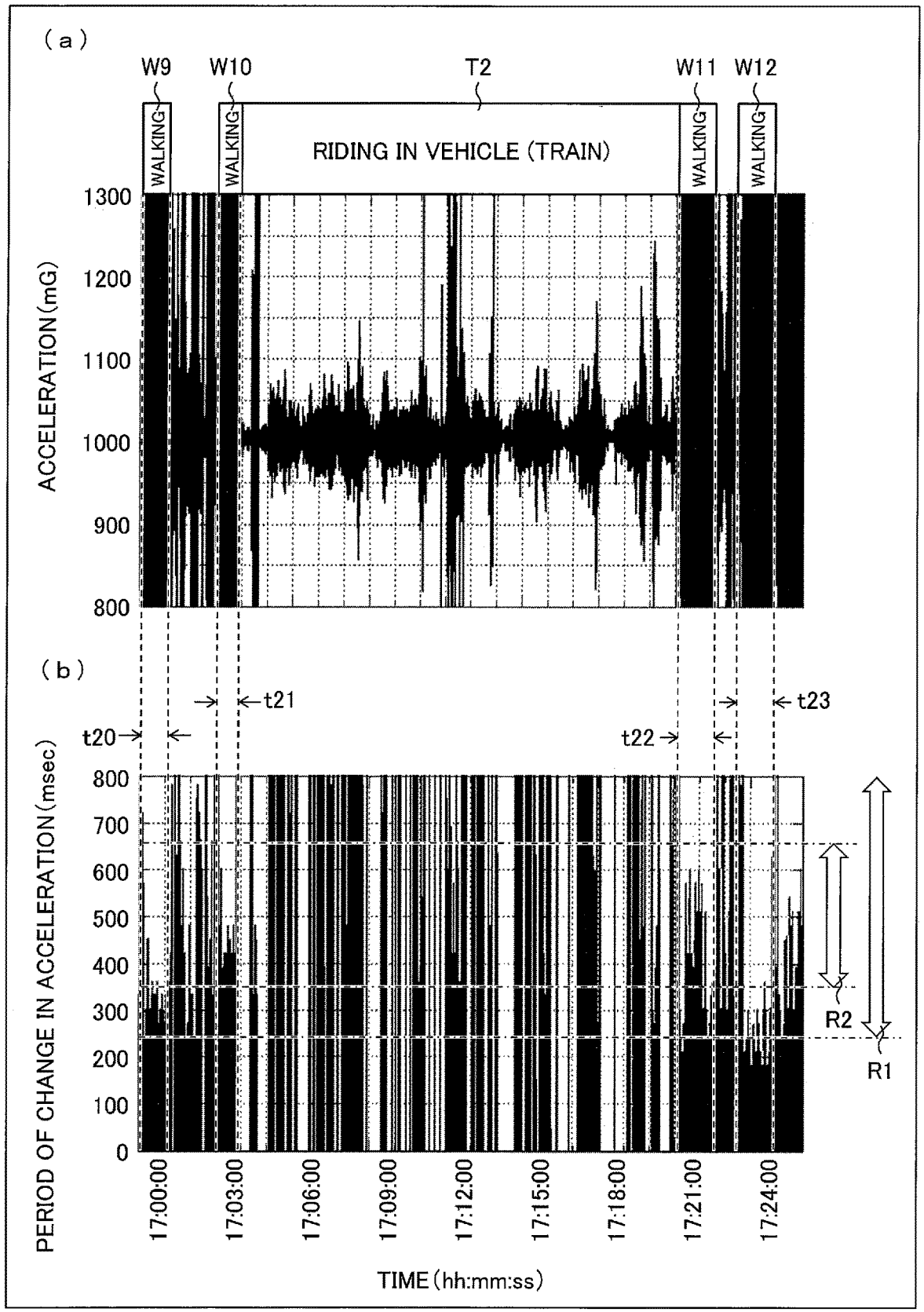

(a) of FIG. 11 is another example of a graph illustrating fluctuations of a synthetic acceleration value which is generated from acceleration values detected in a case where a user walks before and after traveling in a train. (b) of FIG. 11 is an example of a graph obtained by plotting periods of the respective fluctuations of the synthetic acceleration value illustrated in (a) of FIG. 11.

Figure 12:
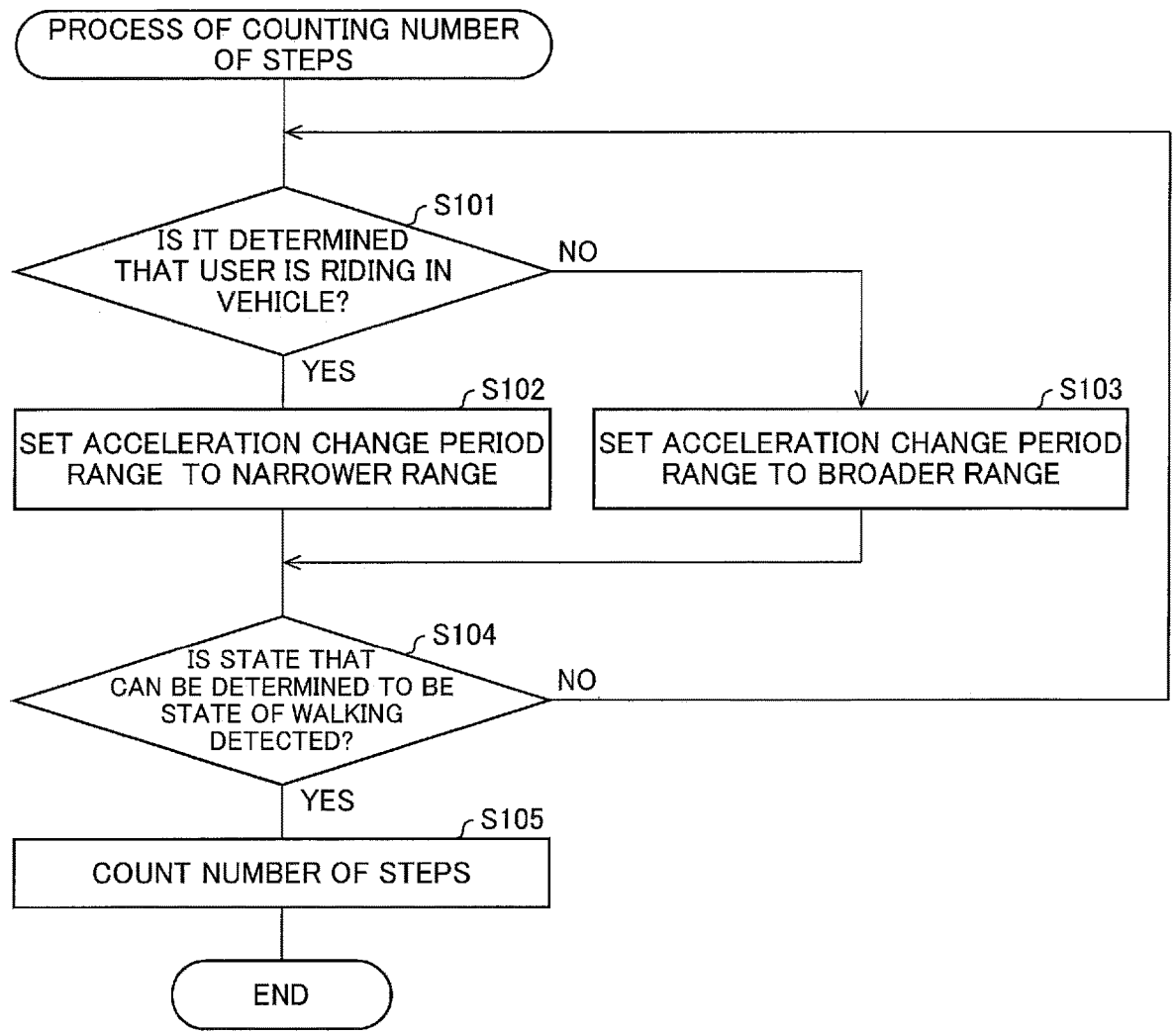

FIG. 12 is a flowchart illustrating a flow of a process that the electronic device carries out to count the number of steps.

Figure 13:
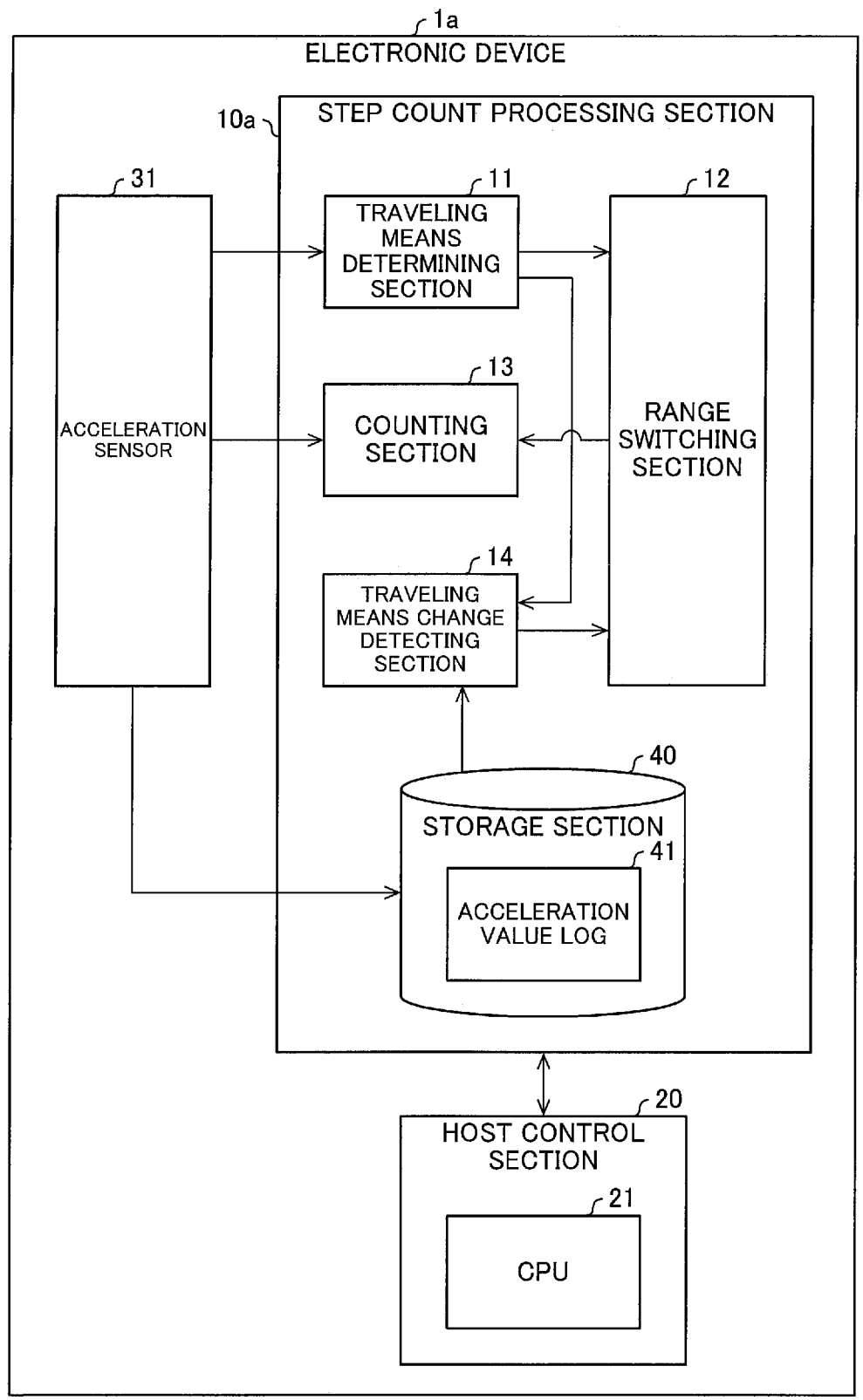

FIG. 13 is a functional block diagram illustrating an example of a main configuration of an electronic device in accordance with another embodiment of the present invention.

FIG. 14 is a flowchart illustrating a flow of a process that the electronic device carries out to avoid erroneous count of the number of steps.

DESCRIPTION OF EMBODIMENTS

Embodiment 11

The following description will discuss embodiments of the present invention in detail. An electronic device 1 in accordance with Embodiment 1 of the present invention (i) determines whether a user is walking or using a traveling means other than walking, and (ii) switches between acceleration value change period ranges for counting the number of steps, depending on whether it is determined that the user is walking or that the user is using a traveling means other than walking.

(Hardware Configuration of Electronic Device)

Figures 2, 3:
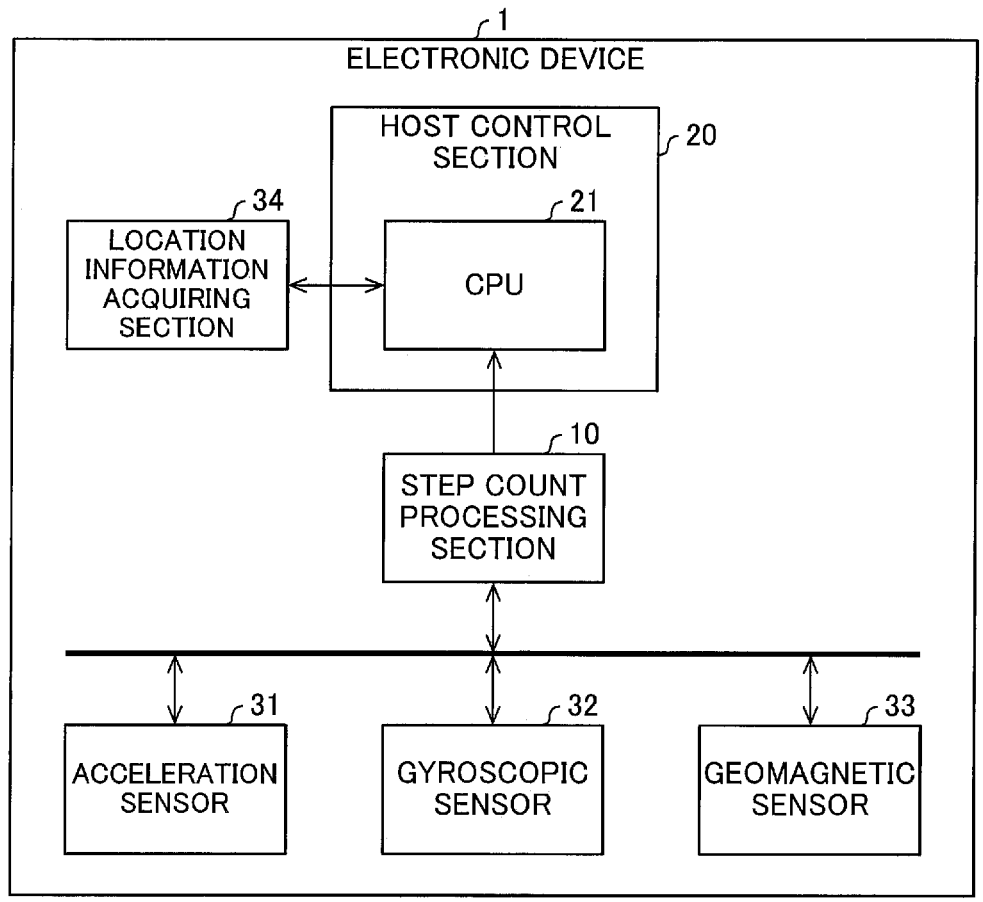
FIG. 2 is a block diagram illustrating an example of a hardware configuration of the electronic device.
FIG. 3 is a diagram illustrating an example of a configuration for switching between acceleration change period ranges for counting the number of steps, depending on whether or not a user is riding in a vehicle.

First, a hardware configuration of the electronic device 1 will be discussed below with reference to FIG. 2. FIG. 2 is a block diagram illustrating an example of the hardware configuration of the electronic device 1. The electronic device 1 includes a step count processing section 10, a host control section 20, an acceleration sensor 31, a gyroscopic sensor 32, a geomagnetic sensor 33, and a location information acquiring section 34.

The acceleration sensor 31 is a sensor that detects accelerations acting on the electronic device 1 in respective three axis directions. The three axis directions are, for example, a longitudinal direction, a lateral direction, and a height direction. As the respective three axis directions, directions such as a direction (Z-axis direction) parallel to gravity and two different directions (X-axis direction and Y-axis direction) each vertical to gravity can be calculated and employed. The acceleration sensor 31 supplies data indicative of acceleration values thus detected to the step count processing section 10.

The step count processing section 10 is a circuit (which is also called a sensor microcomputer) that (i) accepts input of sensor signals supplied respectively from various sensors such as the acceleration sensor 31, the gyroscopic sensor 32, and the geomagnetic sensor 33 and (ii) aggregates pieces of information indicated by the sensor signals. That is, in place of a CPU 21 of the host control section 20 that executes processes related to respective functions of the electronic device 1, the step count processing section 10 (i) receives and temporarily stores the sensor signals supplied respectively from the various sensors and (ii) executes a given process in accordance with the sensor signals. Information obtained as a result of processing by the step count processing section 10 is transmitted to the host control section 20.

The electronic device 1 can include, in addition to the acceleration sensor 31, a sensor or the like that can be applied to determination of a traveling means used by a user. FIG. 2 illustrates the gyroscopic sensor 32 and the geomagnetic sensor 33 as examples of such a sensor. Each of the gyroscopic sensor 32 and the geomagnetic sensor 33 is a sensor that supplies sensor information that can be used to (i) identify location information of the electronic device 1 and (ii) extract information related to a distance which the electronic device 1 has traveled, in combination with data indicative of the accelerations detected by the acceleration sensor 31. Note that, though the electronic device 1 includes the gyroscopic sensor 32 and the geomagnetic sensor 33 in the example discussed here, the gyroscopic sensor 32 and the geomagnetic sensor 33 are not essential configurations of the electronic device 1, and detailed descriptions thereof will be therefore omitted below.

Meanwhile, the electronic device 1 can be configured to acquire location information indicative of a current location of the electronic device 1 so as to determine a traveling means used by the user. The location information acquiring section 34 illustrated in FIG. 2 (i) receives the location information indicative of the current location of the electronic device 1 from, for example, a GPS satellite (not illustrated), and (ii) supplies the location information thus received to the CPU 21 of the host control section 20. Note that the location information to be received by the location information acquiring section 34 is not limited to location information from the GPS satellite, as long as the location information acquiring section 34 can acquire the location information indicative of the current location of the electronic device 1. Such location information can be, for example, location information from a positioning satellite system of any country other than the GPS satellite.

Alternatively, instead of receiving the location information from a satellite, the location information acquiring section 34 can acquire the location information by (i) communication with a Wi-Fi (registered trademark) access point, (ii) use of a base station positioning function, or (iii) use of information received from a beacon such as a Bluetooth (registered trademark) beacon. Note that the location information acquiring section 34 is not an essential configuration of the electronic device 1, and a detailed description thereof will be therefore omitted below.

Though the above description has discussed Embodiment 1 by taking, as an example, a case where the step count processing section 10 is a circuit that (i) accepts input of sensor signals supplied respectively from various sensors and (ii) aggregates pieces of information indicated respectively by the sensor signals, the present invention is not limited to such a configuration. For example, processes to be executed by the step count processing section 10 can alternatively be executed by the host control section 20. In such a case, the processes to be executed by the step count processing section 10 can be executed by the CPU 21 or, alternatively, by another CPU (not illustrated) different from the CPU 21 in a configuration in which the host control section 20 is configured as a multi-core system.

(Configuration of Mobile Terminal)

Figure 1:
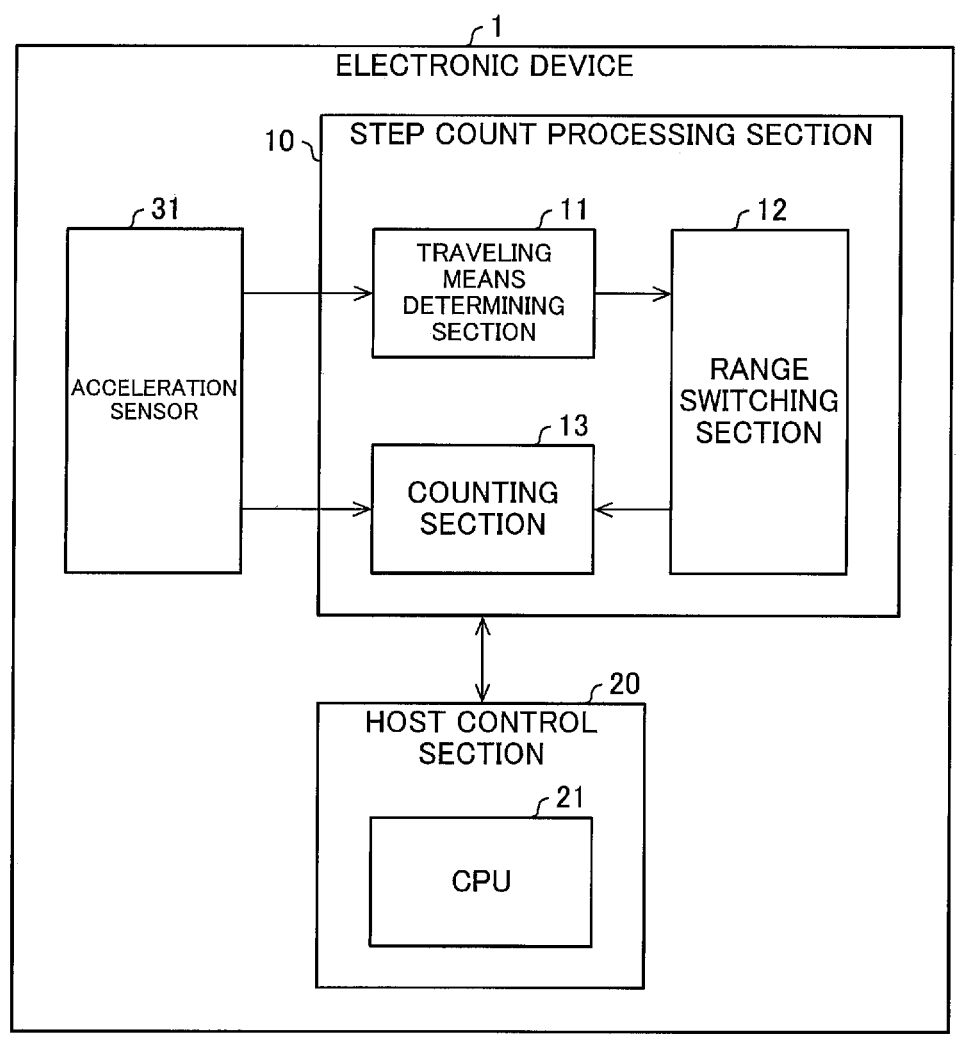
FIG. 1 is a functional block diagram illustrating an example of a main configuration of an electronic device in accordance with Embodiment 1 of the present invention.

Next, a schematic configuration of the electronic device 1 will be discussed below with reference to FIG. 1. FIG. 1 is a functional block diagram illustrating an example of a main configuration of the electronic device 1. For convenience, members identical in function to those discussed with reference to FIG. 2 are given the same reference numerals, and descriptions thereof will be omitted below.

The step count processing section 10 includes a traveling means determining section 11 (determining section), a range switching section 12 (step counting section), and a counting section 13 (step counting section).

The traveling means determining section 11 (i) obtains data indicative of acceleration values from the acceleration sensor 31, (ii) calculates a synthetic acceleration value (hereinafter, which may also be referred to simply as an "acceleration value") obtained as (a) a result of synthesizing the acceleration values in respective directions or (b) a result of synthesizing the acceleration values by computation in view of respective directions (e.g., a horizontal direction, a perpendicular direction, etc.) of acceleration components, and (iii) extracts, for example, a magnitude (amplitude) of change (change over time) in acceleration value, and a feature of the change in acceleration value and/or a feature of a fluctuation pattern of the acceleration value. For example, a synthetic acceleration value A can be calculated by $A=(A_X^2+A_Y^2+A_Z^2)^{1/2}$ where $A_X$ is an acceleration acting in the X-axis direction, $A_Y$ is an acceleration acting in the Y-axis direction, and $A_Z$ is an acceleration acting in the Z-axis direction. It has been known that change in acceleration value and a fluctuation pattern of the acceleration value each vary depending on, for example, whether a user is walking or traveling by car (by driving a car) or by train. The traveling means determining section 11 determines whether a user is staying at a position (not traveling), traveling by walking, or traveling by using a vehicle such as a car or a train, based on the change in acceleration value and the fluctuation pattern of the acceleration value, which acceleration value is supplied from the acceleration sensor 31. Note that the traveling means determining section 11 can determine the traveling means used by the user based on, other than the change in acceleration value and the fluctuation pattern of the acceleration value, variation over time of the magnitude (amplitude) of change in acceleration value. A result of determination made by the traveling means determining section 11 is transmitted to the range switching section 12.

The range switching section 12 switches between the acceleration value change period ranges for counting the number of steps, depending on whether the traveling means determining section 11 determines that the user is walking or that the user is using a traveling means other than walking. The range switching section 12 can carry out the switching by selecting one of the acceleration value change period ranges for counting the number of steps, which ranges are associated in advance with respective kinds of traveling means that can be used by the user. Note that the counting section 13 (described later) can be configured to have a function of the range switching section 12. The acceleration value change period ranges for counting the number of steps, which ranges are associated in advance with the respective kinds of traveling means that can be used by the user, will be described later with reference to specific examples.

The counting section 13 counts the number of steps in a case where (i) a magnitude (amplitude) of change in acceleration value is not smaller than a given amplitude (e.g., 800 mG) and (ii) a period of the change in acceleration value falls within an acceleration value change period range for counting the number of steps, which range is set by the range switching section 12. That is, the counting section 13 counts the number of steps in a case where a detected change in acceleration value is consistent with (i) an amplitude of change in acceleration value which change results from vibration caused by walking, and (ii) the change in acceleration value and/or (iii) a fluctuation pattern of the acceleration value. The counting section 13 supplies data indicative of the number of steps thus counted to the host control section 20. The data indicative of the number of steps thus counted can be used for, for example, a navigation function or a health management function of the electronic device 1. Furthermore, a result of counting the number of steps can be displayed on a display section (not illustrated) in real time.

It has been known that even in a case where, for example, a user is not walking but traveling by car, train, or the like, a detected change in acceleration value may be similar to that in a case where the user is walking. If, while the user is traveling by car, train, or the like, the number of steps is counted as in a case where the user is walking, the number of steps may be erroneously counted despite the fact that the user is not walking.

With the above configuration, the electronic device 1 switches between the acceleration value change period ranges for counting the number of steps, depending on whether the user is walking or using a traveling means other than walking, so as not to erroneously count the number of steps in a case where the user is not walking but traveling by car, train, or the like. As a result, in a case where the user is using a traveling means other than walking, it is possible to avoid erroneous count of the number of steps taken by the user due to count based on change in acceleration value caused by the traveling means. It is therefore possible to accurately count the number of steps even in a case where the user changes a traveling means.

(Acceleration Value Change Period Ranges for Counting Number of Steps)

Next, the following will discuss how the acceleration value change period ranges for counting the number of steps are switched depending on whether (i) a user is walking but not riding in a vehicle or (ii) the user is riding in a vehicle. The acceleration value change period ranges for counting the number of steps will be discussed below with reference to FIG. 3. FIG. 3 is a diagram illustrating an example of a configuration for switching between the acceleration value change period ranges for counting the number of steps, depending on whether or not a user is riding in a vehicle.

The applicant analyzed how (a) change in acceleration value detected by the acceleration sensor 31, (b) a fluctuation pattern of the acceleration value, and (c) a period of change in the acceleration value vary depending on whether a user is (i) walking without using a vehicle such as a car or a train or (ii) traveling by car, train, or the like, and studied features of the above items (a) to (c) in each of the above cases (i) and (ii). As a result of the study, the applicant found that it is possible to accurately count the number of steps by switching between the acceleration value change period ranges for counting the number of steps, depending on whether it is determined that a user is walking or that the user is using a traveling means other than walking.

The electronic device 1 counts the number of steps taken by a user in a case where (i) an amplitude of change in acceleration value supplied from the acceleration sensor 31 is not smaller than a given value (e.g., 800 mG) and (ii) a period of the change in acceleration value falls within a given range. The range switching section 12 switches the given range depending on a state of the user. For example, the range switching section 12 switches between the acceleration value change period ranges for counting the number of steps, depending on whether the traveling means determining section 11 determines that the user is walking or that the user is using a traveling means other than walking.

FIG. 3 illustrates an example in which (i) in a case where a user is walking, the given range is set to a range R1 (e.g., from 240 msec to 2100 msec) (first range) which is an acceleration value change period range for counting the number of steps, and (ii) in a case where the user is riding in a vehicle, the given range is set to a range R2 (e.g., from 350 msec to 650 msec) (second range) which is another acceleration value change period range for counting the number of steps. In this way, the acceleration value change period ranges for counting the number of steps are switched each other, depending on a traveling means of the user as described above. As a result, in a case where the user is using a traveling means other than walking, it is possible to avoid erroneous count of the number of steps taken by the user due to count based on change in acceleration value caused by the traveling means. Note that respective numeric ranges of the ranges R1 and R2 shown in FIG. 3 are illustrative only, and those numeric ranges can be arbitrarily set as appropriate as long as they can make it possible to accurately count the number of steps.

Note that, though FIG. 3 illustrates an example in which the range R2, which is an acceleration value change period range for counting the number of steps in a case where the user is riding in a vehicle, is set to be narrower than the range R1, which is another acceleration value change period range for counting the number of steps in a case where the user is walking, an embodiment of the present invention is not limited to such a configuration. In some cases, depending on a traveling means used by the user, it is preferable to set the range R2, which is an acceleration value change period range for counting the number of steps, to be narrower than the range R1, which is another acceleration value change period range for counting the number of steps in a case where the user is walking. Meanwhile, in some cases, it is preferable to set the ranges R1 and R2 such that they do not overlap each other.

(Comparison Between Change in Acceleration Value that Occurs while User is Walking and Change in Acceleration Value that Occurs while User is Riding in Vehicle)

The following will discuss the range R1, which is an acceleration value change period range for counting the number of steps in a case where a user is walking, with reference to FIGS. 4 and 5. (a) of FIG. 4 is an example of a graph illustrating fluctuations of a synthetic acceleration value which is generated from acceleration values detected in a case where a user is traveling by walking. (b) of FIG. 4 is an example of a graph obtained by plotting periods of the respective fluctuations of the synthetic acceleration value illustrated in (a) of FIG. 4. (a) of FIG. 5 is an example of a graph illustrating fluctuations of a synthetic acceleration value which is generated from acceleration values detected in a case where a user is traveling by running. (b) of FIG. 5 is an example of a graph obtained by plotting periods of the respective fluctuations of the synthetic acceleration value illustrated in (a) of FIG. 5.

As illustrated in (a) of FIG. 4, (i) an amplitude of change in acceleration value detected in a state W1 in which the user is walking is not smaller than 800 mG (note that (a) of FIG. 4 illustrates an amplitude of up to 500 mG) and (ii) an amplitude of change in acceleration value detected in a case where the user is not walking is smaller than 800 mG. Furthermore, it is found from (b) of FIG. 4 that a fluctuation range of periods of change in acceleration value is stable during a time t1 of the state W1 in which the user is walking. In light of the above fact, it is found that, in a case where the user is walking, it is possible to accurately count the number of steps by (i) setting an extent of an acceleration value change period range for counting the number of steps to the range R1 (e.g., from 240 msec to 2100 msec) (first range) and (ii) counting the number of steps upon detection of a period of change in acceleration value which period falls within the range R1.

The above finding also applies to a case where the user is traveling by running as illustrated in FIG. 5. That is, an amplitude of change in acceleration value detected in a state WR in which the user is walking (running) is large and, for example, not smaller than 800 mG. Furthermore, it is found from (b) of FIG. 5 that a fluctuation range of periods of change in acceleration value is stable during a time t2 in the state WR in which the user is walking (running). In light of the above fact, it is found that, also in a case where the user is running, it is possible to accurately count the number of steps by (i) setting an extent of an acceleration value change period range for counting the number of steps to the range R1 (e.g., from 240 msec to 2100 msec) (first range) and (ii) counting the number of steps upon detection of a period of change in acceleration which period falls within the range R1.

Next, the following will discuss a period of change in acceleration detected in a case where a user is traveling by vehicle, with reference to FIGS. 6 and 7. (a) of FIG. 6 is an example of a graph illustrating fluctuations of a synthetic acceleration value which is generated from acceleration values detected in a case where a user is traveling in a car. (b) of FIG. 6 is an example of a graph obtained by plotting periods of the respective fluctuations of the synthetic acceleration value illustrated in (a) of FIG. 6. (a) of FIG. 7 is an example of a graph illustrating fluctuations of a synthetic acceleration value which is generated from acceleration values detected in a case where a user is traveling in a train. (b) of FIG. 6 is an example of a graph obtained by plotting periods of the respective fluctuations of the synthetic acceleration value illustrated in (a) of FIG. 7.

There exists a time in which an amplitude of change in detected acceleration value is not smaller than 800 mG (see, for example, times t3 through t5 in (b) of FIG. 6 and a time t6 in (b) of FIG. 7), both (i) in a state C1 in which the user is traveling in a car ((a) of FIG. 6) and (ii) in a state TI in which the user is traveling in a train ((a) of FIG. 7). In a conventional detection method, vibration caused by a vehicle during the above time may be erroneously detected as vibration caused by walking.

Furthermore, it is found that a short-period change in acceleration value is more likely to be detected in a case where a user is traveling by car, train, or the like. It is also found that a long-period change in acceleration value is more likely to be detected (i) in a case where a user is walking so as to avoid other passengers in a vehicle and (ii) in a case where a user is operating the electronic device 1 in a vehicle.

In light of the above, in a case where the user is riding in a vehicle, the electronic device 1 switches the acceleration value change period range for counting the number of steps to the range R2 (e.g., from 350 msec to 650 msec) (second range) (see the example illustrated in FIG. 3). It is found that, by switching between the acceleration value change period ranges for counting the number of steps depending on a traveling means used by the user, it is possible to avoid erroneous count of the number of steps taken by the user due to count based on, for example, a period of change in acceleration value detected during the times t3 through t5 or the time t6.

(Verification in Case where User Changes Traveling Means)

Each of FIGS. 8 through 11 is a diagram illustrating an example for explaining an effect brought about by switching between the acceleration value change period ranges for counting the number of steps depending on whether (i) the user is walking but not riding in a vehicle or (ii) the user is riding in a vehicle. (a) of each of FIGS. 8 through 11 is an example of a graph illustrating fluctuations of a synthetic acceleration value which is generated from acceleration values detected in a case where a user walks before and after traveling by vehicle. (b) of each of FIGS. 8 through 11 is an example of a graph obtained by plotting periods of the respective fluctuations of the synthetic acceleration value illustrated in (a) of a corresponding one of FIGS. 8 through 11.

It is found that there exists a time in which an amplitude of change in detected acceleration value is not smaller than 800 mG (see, for example, times t11 through t13 in (b) of FIG. 9 and times t16 through t18 in (b) of FIG. 10), both (i) in a state C3 in which the user is traveling in a car ((a) of FIG. 9) and (ii) in a state C4 in which the user is traveling in a car ((a) of FIG. 10). In a case where the acceleration value change period range in the above times is set to the range R1 (e.g., from 240 msec to 2100 msec) (first range) as in any of states W2 through W8 in which the user is walking, vibration caused by a vehicle may be erroneously detected as vibration caused by walking during the above time. In light of this fact, it is found that (i) the acceleration value change period range for counting the number of steps should be switched to the range R2 in a case where the user is traveling by using a traveling means other than walking (i.e., using a vehicle such as a car or a train) and (ii) the acceleration value change period range for counting the number of steps should be switched from the range R2 to the range R1 in a case where the user has exited a vehicle and started walking.

(Flow of Process of Counting Number of Steps)

Next, the following will discuss a flow of a process which the electronic device 1 carries out to count the number of steps, with reference to FIG. 12. FIG. 12 is a flowchart illustrating the flow of the process that the electronic device 1 carries out to count the number of steps.

The traveling means determining section 11 (*i*) calculates a synthetic acceleration value by using data indicative of acceleration values, which data has been received from the acceleration sensor 31, and (ii) extracts an amplitude of change in acceleration value, a feature of the change in acceleration value and/or a feature of a fluctuation pattern of the acceleration value, and the like. The traveling means determining section 11 then analyzes the amplitude of the change in acceleration value, the feature of the change in acceleration value and/or the feature of the fluctuation pattern of the acceleration value, and the like, so as to determine whether a user is walking or riding in a vehicle such as a car (S101: determination step).

In a case where the traveling means determining section 11 determines that the user is riding in a vehicle (YES in S101), the range switching section 12 sets an extent of an acceleration value change period range to a narrower range (S102: step counting step, range switching step). In contrast, in a case where the traveling means determining section 11 determines that the user is not riding in a vehicle (NO in S101), the range switching section 12 sets the extent of the acceleration value change period range to a broader range (S103: step counting step, range switching step).

In a case where a detected state is a state that can be determined to be a state of walking (YES in S104), the counting section 13 counts the number of steps (S105: step counting step). Note here that the state that can be determined to be a state of walking refers to a state in which, for example, (i) an amplitude of change in acceleration value is not smaller than a given amplitude (e.g., 800 mG) and (ii) a period of the change in acceleration value falls within an acceleration value change period range for counting the number of steps, which range is set by the range switching section 12. In a case where a detected state is not the state that can be determined to be a state of walking (NO in S104), the counting section 13 does not count the number of steps.

Embodiment 2

The following description will discuss Embodiment 2 of the present invention with reference to FIGS. 13 and 14. For convenience, members identical in function to those discussed in Embodiment 1 are given the same reference numerals, and descriptions thereof will be omitted below. FIG. 13 is a functional block diagram illustrating an example of a main configuration of an electronic device 1a in accordance with Embodiment 2 of the present invention.

The electronic device 1a illustrated in FIG. 13 differs from the above-described electronic device 1 in that a step count processing section 10a of the electronic device 1a further includes (i) a storage section 40 including an acceleration value log 41 (recording section) and (ii) a traveling means change detecting section 14 (change detecting section). The acceleration value log 41 is configured to record (i) data indicative of an acceleration value detected by an acceleration sensor 31 at a past time point and (ii) data indicative of a period of change in the acceleration value.

As illustrated in each of FIGS. 4 and 5, a fluctuation range of periods of change in detected acceleration value is stable in a state W1 in which a user is walking or in a state WR in which a user is running. In contrast, a fluctuation range of periods of change in detected acceleration value is less stable during a time in which an amplitude of the change in acceleration value is not smaller than 800 mG in each of states C1 through C4, T1, and T2 in which the user is traveling in a vehicle such as a car or a train (see FIG. 6 through FIG. 11), as compared with the state W1 in which the user is walking and the state WR in which the user is running. That is, a degree of stability of the period of the change in detected acceleration value (i) is likely to be high in a case where the user is walking and (ii) is likely to be low in a case where the user is traveling in a vehicle such as a car or a train.

In light of the above, in a case where a traveling means determining section 11 determines that a user is using a traveling means other than walking, a counting section 13 of the electronic device 1a (i) compares, with a given fluctuation range, a fluctuation of periods of change in acceleration value at a current time point (e.g., a 10-second time period including the current time point) at which an acceleration value change period range for counting the number of steps is set to a range R2 (second range) and (ii) compares, with the given fluctuation range, a fluctuation of periods of change in acceleration value at a past time point (e.g., a 10-second time period from 30 seconds prior to the current time point to 20 seconds prior to the current time point) at which the acceleration value change period range for counting the number of steps was set to the range R2, which periods at the past time point are recorded in the acceleration value log 41. Then, in a case where (i) the fluctuation of periods of change in acceleration value at the past time point is beyond the given fluctuation range and (ii) the fluctuation of periods of change in acceleration value at the current time point stably falls within the given fluctuation range, the counting section 13 counts the number of steps at the current time point.

The above configuration makes it possible to avoid erroneous count of the number of steps even in a case where, for example, a period of change in acceleration value detected while the user is using a vehicle temporarily falls within a given acceleration value change period range. This allows an improvement in accuracy of counting the number of steps. Note that a process of avoiding erroneous count of the number of steps will be discussed later.

In determining a traveling means based on change in acceleration value and a fluctuation pattern of the acceleration value, it is sometimes difficult to accurately detect when the user exited a vehicle. In light of this fact, the electronic device 1a further includes the acceleration value log 41 and the traveling means change detecting section 14 so as to detect, based on a degree of stability of a period of change in detected acceleration value, whether the user has changed a traveling means. This allows the electronic device 1a to avoid erroneous count of the number of steps.

That is, in a case where the traveling means determining section 11 determines that a user is using a traveling means other than walking, the traveling means change detecting section 14 (i) compares, with a given fluctuation range, a fluctuation of periods of change in acceleration value at the current time point, which periods fall within the range R2, and (ii) compares, with the given fluctuation range, a fluctuation of periods of change in acceleration at the past time point, which periods are recorded in the acceleration value log 41 and fall within the range R2. Subsequently, in a case where (i) the fluctuation of periods of change in acceleration value at the past time point is beyond the given fluctuation range (e.g., a range from 200 msec above an average of periods of change in acceleration value to 200 msec below the average) and (ii) the fluctuation of periods of change in acceleration at the current time point stably falls within the given fluctuation range, the traveling means change detecting section 14 determines that, during a time period from the past time point to the current time point, the user shifted from traveling by the traveling means other than walking to traveling by walking. The traveling means change detecting section 14 transmits a result of the determination to the range switching section 12.

The range switching section 12 acquires (i) a result of determination made by the traveling means determining section 11 and (ii) the result of determination made by the traveling means change detecting section 14, and sets an acceleration value change period range for counting the number of steps to a range associated with a current traveling means of the user. Note that the result of determination made by the traveling means determining section 11 and the result of determination made by the traveling means change detecting section 14 may indicate, respectively, different states, as in a case where (i) the result of determination made by the traveling means determining section 11 indicates that the user is riding in a vehicle whereas (ii) the result of determination made by the traveling means change detecting section 14 indicates that the user has exited the vehicle and is currently walking. In such a case, the result of determination made by the traveling means change detecting section 14 can be preferentially adopted. In a case where the result of determination made by the traveling means change detecting section 14 is preferentially adopted, the result of determination made by the traveling means determining section 11 can be used as supplemental information when the range switching section 12 sets the acceleration value change period range for counting the number of steps.

(Process of Avoiding Erroneous Count of Number of Steps)

Next, a process of avoiding erroneous count of the number of steps will be discussed below with reference to FIG. 14. FIG. 14 is a flowchart illustrating a flow of a process that the electronic device 1a carries out to avoid erroneous count of the number of steps. Note that, though discussed below is a configuration in which whether a user has changed a traveling means is determined by comparing (i) a fluctuation range of periods of change in acceleration value at the current time point and (ii) respective fluctuation ranges of periods of change in acceleration value at two different past time points, an embodiment of the present invention is not limited to such a configuration. In determining whether a user has changed a traveling means, the number of past time points to be compared with the current time point in regard to fluctuation ranges of periods of change in acceleration value can be, for example, one, three, or more.

However, in a case where the number of past time points to be compared with the current time point in regard to fluctuation ranges of periods of change in acceleration value is smaller, a process required to determine whether the user has changed a traveling means will be simpler but determination will be less accurate. In contrast, in a case where the number of past time points to be compared with the current time point in regard to fluctuation ranges of periods of change in acceleration value is larger, determination will be more accurate but the process required to determine whether the user has changed a traveling means will require more steps and therefore will be more complicated. In view of the above conditions, it is possible to select an optimal configuration for the electronic device 1a.

The traveling means determining section 11 (i) calculates a synthetic acceleration value by using data indicative of acceleration values, which data has been received from the acceleration sensor 31, and (ii) extracts an amplitude of change in acceleration value, a feature of the change in acceleration value and/or a feature of a fluctuation pattern of the acceleration value, and the like. The traveling means determining section 11 then analyzes the amplitude of the change in acceleration value, the feature of the change in acceleration value and/or the feature of the fluctuation pattern of the acceleration value, and the like, so as to determine whether a user is walking or riding in a vehicle such as a car (S201: determination step).

In a case where the traveling means determining section 11 determines that the user is riding in a vehicle (YES in S201), an amplitude and a period of change in acceleration value detected in a state that can be determined to be a state of walking is periodically recorded in the acceleration value log 41 at fixed time intervals. In an example illustrated in FIG. 14, the acceleration value log 41 records amplitudes and periods of change in acceleration value, which are detected in the state that can be determined to be a state of walking, during each of (i) 10-second time period (past time point [A]) from 30 seconds prior to the current time point to 20 seconds prior to the current time point, (ii) 10-second time period (past time point [B]) from 20 seconds prior to the current time point to 10 seconds prior to the current time point, and (iii) 10-second time period (current time point [C]) including the current time point (S202: recording step). Subsequently, the traveling means change detecting section 14 compares the amplitudes of change in acceleration value and also compares the degrees of stability of the periods of change in acceleration value, which amplitudes and periods are detected at the past time points [A] and [B] and current time point [C] in the state that can be determined to be a state of walking (S203).

In a case where the traveling means change detecting section 14 detects that (i) the amplitude of change in acceleration value at the current time point is not smaller than a certain value (e.g., not smaller than 800 mG) and (ii) the fluctuation of the periods of change in acceleration value at the current time point stably falls within a given fluctuation range (e.g., a range from 200 msec above an average of periods of change in acceleration value to 200 msec below the average) (YES in S204), the counting section 13 counts the number of steps (S205: step counting step). In contrast, in a case where the traveling means change detecting section 14 detects that (i) the amplitude of change in acceleration value at the current time point is smaller than the certain value (e.g., smaller than 800 mG) and/or (ii) the fluctuation of the periods of change in acceleration value at the current time point is unstable and ranges beyond the given fluctuation range (e.g., a range from 200 msec above an average of periods of change in acceleration value to 200 msec below the average) (NO in S204), the process returns back to S201.

For example, in a case where (i) the fluctuation of the periods of change in acceleration value at the current time point [C] falls within the given fluctuation range and (ii) the periods of change in acceleration value at the current time point [C] is compared with the periods of change in acceleration value at the past time points [A] and [B], the traveling means change detecting section 14 yields the following determination result. Note that, in the following determination result, the "past time point [A]" means, for example, a 10-second time period from 30 seconds prior to the current time point to 20 seconds prior to the current time point, the "past time point [B]" means, for example, a 10-second time period from 20 seconds prior to the current time point to 10 seconds prior to the current time point, and the "current time point [C]" means, for example, a 10-second time period including the current time point.

In a case where respective fluctuations of the periods of change in acceleration value at the respective past time points [A] and [B] do not fall within the given fluctuation range, it is determined that the user exited a vehicle during a time period from the past time point [B] to the current time point [C].

In a case where (i) the fluctuation of the periods of change in acceleration value at the past time point [B] falls within the given fluctuation range as with the period of change in acceleration value at the current time point [C] and (ii) the fluctuation of the periods of change in acceleration value at the past time point [A] does not fall within the given fluctuation range, it is determined that the user did not exit a vehicle during the time period from the past time point [B] to the current time point [C].

In a case where (i) the fluctuation of the periods of change in acceleration value at the past time point [A] falls within the given fluctuation range as with the fluctuation of the periods of change in acceleration value at the current time point [C] and (ii) the fluctuation of the periods of change in acceleration value at the past time point [B] does not fall within the given fluctuation range, it is determined that the user did not exit a vehicle during the time period from the past time point [B] to the current time point [C].

That is, even in a case where the fluctuation range of the periods of change in acceleration value detected at the current time point [C] indicates a possibility that the user may have exited a vehicle and be currently walking, the traveling means change detecting section 14 does not determine that the user has exited a vehicle and is currently walking unless both of the fluctuation ranges of the periods of change in acceleration value at the respective past time points [A] and [B] fall within the given fluctuation range. For example, in a case where a car stops at a traffic signal or waits for a right time to turn right at an intersection when the user is traveling in the car, the car usually stops for 20 seconds to 40 seconds. Meanwhile, in a case where a train stops at a station, a period of time from the stop at the station to departure to the next station is often 20 seconds to 40 seconds. Accordingly, in order to accurately determine whether a user has changed a traveling means from a previous one to the current one, it is effective to refer not only to a period of change in acceleration value at the current time point but also to periods of change in acceleration value at a past time point(s) (e.g., the past time points [A] and [B]) preceding the current time point.

Note that it is possible to set, depending on a vehicle in which the user is riding, the past time points which are used as the respective past time points [A] and [B] for accurate detection of change in traveling means. That is, it is possible to change the past time points, which are used as the respective past time points [A] and [B], depending on whether a vehicle in which the user is riding is a car or a train.

Modified Example

Embodiments 1 and 2 above each have discussed an example in which an acceleration value change period range for counting the number of steps is set for each of two states, in one of which a user is not riding in a vehicle (but walking) and in the other of which the user is riding in a vehicle (see FIG. 3). An embodiment of the present invention is, however, not limited to such an example. Alternatively, the acceleration value change period range for counting the number of steps can be set for each of, for example, three or more states.

As illustrated in FIGS. 4 through 11, states C1 through C4 in each of which the user is riding in a car differ from states T1 and T2 in each of which the user is riding in a train, in (i) change in acceleration value and (ii) fluctuation pattern of acceleration value. A traveling means determining section 11 can be configured to determine a traveling means based on, for example, change in acceleration value and a fluctuation pattern of acceleration value which feature each traveling means, such as a car, a bus, a tram, a monorail, and a train. In such a case, the acceleration value change period range for counting the number of steps can be set for each type of traveling means as outcomes of determination made by the traveling means determining section 11.

In a case where a determined user's state may lead to failure to count the number of steps or to erroneous count of the number of steps, the acceleration value change period range for counting the number of steps can be set to an acceleration value change period range associated with such a user's state. This configuration makes it possible to reduce a possibility of erroneously detecting, as vibration caused by walking, confusing vibration that is similar to vibration caused by walking. It is therefore possible to accurately count the number of steps without erroneous count.

Embodiment 3

Control blocks (particularly, the traveling means determining section 11, the range switching section 12, the counting section 13, and the traveling means change detecting section 14) of each of the step count processing section 10 of the electronic device 1 and the step count processing section 10a of the electronic device 1a can be each realized by a logic circuit (hardware) provided in an integrated circuit (IC chip) or the like or can be each alternatively realized by software as executed by a central processing unit (CPU).

In the latter case, each of the step count processing section 10 of the electronic device 1 and the step count processing section 10a of the electronic device 1a includes a CPU that executes instructions of a program that is software realizing the foregoing functions; a read only memory (ROM) or a storage device (each referred to as "storage medium") in which the program and various kinds of data are stored in such a form that they are readable by a computer (or a CPU); and a random access memory (RAM) in which the program is loaded. The object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recap]

Each of the electronic devices 1 and 1a in accordance with a first aspect of the present invention includes: a determining section (traveling means determining section 11) configured to determine whether a user is walking or using a traveling means other than walking; and a step counting section (range switching section 12, counting section 13) configured to count the number of steps taken by the user in a case where (i) an amplitude of change in acceleration value supplied from an acceleration sensor 31 is not smaller than a given value and (ii) a period of the change in acceleration value falls within a given range, the step counting section switching the given range between acceleration value change period ranges for counting the number of steps, depending on whether the determining section determines that the user is walking or that the user is using a traveling means other than walking.

For example, it has been known that, in a case where a user is traveling in a car, a bus, a train, or the like, detected change in acceleration value may be a change which is similar to that in a case where the user is walking or running. In a case where the number of steps is counted while the user is traveling in a car, a bus, a train or the like as with a case where the user is walking, the number of steps may be erroneously counted though the user is not walking.

The above configuration switches the given range between the acceleration value change period ranges for counting the number of steps, depending on whether the user is walking or using a traveling means other than walking. As a result, in a case where the user is using a traveling means other than walking, it is possible to avoid erroneous count of the number of steps taken by the user due to count based on change in acceleration value. It is therefore possible to accurately count the number of steps even in a case where the user changes a traveling means.

The electronic device in accordance with a second aspect of the present invention can be configured such that, in the first aspect of the present invention, a first range and a second range are different in extent from each other, the first range being one of the acceleration value change period ranges for counting the number of steps, which one is used to count the number of steps in a case where it is determined that the user is walking, the second range being the other one of the acceleration value change period ranges for counting the number of steps, which other one is used to count the number of steps in a case where it is determined that the user is using a traveling means other than walking.

According to the above configuration, the acceleration value change period range for counting the number of steps in a case where the user is traveling by walking differs in extent from the acceleration value change period range for counting the number of steps in a case where the user is traveling by using a traveling means other than walking. This makes it possible to avoid erroneous count of the number of steps in a case where the user is traveling by using a traveling means other than walking.

It has been generally known that, in a case where a user is traveling in a car, a bus, a train, or the like, a period of change in acceleration value more widely fluctuates as compared with a case where the user is walking. Therefore, it is possible to effectively avoid erroneous count of the number of steps by, for example, setting the acceleration value change period range for counting the number of steps to a narrower range in a case where the user is traveling by using a traveling means other than walking, as compared with a case where the user is traveling by walking.

The electronic device in accordance with a third aspect of the present invention can be configured to further include, in the second aspect of the present invention, a recording section (acceleration value log 41) configured to record the period of the change in acceleration value, in a case where the determining section determines that the user is using a traveling means other than walking, the step counting section (a) comparing, with a predetermined fluctuation range, a fluctuation of the period of change in acceleration value at a current time point, which period at the current time point falls within the second range, and (b) comparing, with the predetermined fluctuation range, a fluctuation of the period of change in acceleration value at a past time point, which period at the past time point is recorded in the recording section and falls within the second range, in a case where (i) the period of change in acceleration value at the past time point fluctuated beyond a given fluctuation range and (ii) the fluctuation of the period of change in acceleration value at the current time point stably falls within the given fluctuation range, the step counting section counting the number of steps at the current time point.

According to the above configuration, in a case where the user is using a traveling means other than walking, each of (a) the period of change in acceleration value at the current time point, which period falls within the second range, and (b) the period of change in acceleration value at the past time point, which period falls within the second range, is compared with the predetermined fluctuation range. Then, in a case where (i) the period of change in acceleration value at the past time point fluctuated beyond a given fluctuation range and (ii) the period of change in acceleration value at the current time point stably falls within the given fluctuation range, the number of steps are counted. This makes it possible to avoid erroneous count of the number of steps even in a case where, for example, a period of change in acceleration value detected while the user is using a traveling means such as a car or a bus temporarily falls within a given acceleration value change period range. This allows an improvement in accuracy of counting the number of steps.

The electronic device in accordance with a fourth aspect of the present invention can be configured to further include, in the third aspect of the present invention, a change detecting section (traveling means change detecting section 14) configured to detect change in traveling means, in a case where the determining section determines that the user is using a traveling means other than walking, the change detecting section (a) comparing, with the given fluctuation range, the fluctuation of the period of change in acceleration value at the current time point, which period at the current time point falls within the second range, and (b) comparing, with the given fluctuation range, the fluctuation of the period of change in acceleration value at the past time point, which period at the past time point is recorded in the recording section and falls within the second range, in a case where (i) the period of change in acceleration value at the past time point fluctuated beyond the given fluctuation range and (ii) the fluctuation of the period of change in acceleration at the current time point stably falls within the given fluctuation range, the change detecting section determining that, during a period from the past time point to the current time point, the user shifted from traveling by a traveling means other than walking to traveling by walking.

In a case where the user is using a traveling means other than walking, a fluctuation range of periods of change in acceleration value supplied from the acceleration sensor is more likely to be large and unstable. In contrast, in a case where the user is traveling by walking, the fluctuation range of periods of change in acceleration value supplied from the acceleration sensor is more likely to be small and stable.

According to the above configuration, in a case where (i) the amplitude of change in acceleration value is not smaller than the given value, (ii) the period of the change in acceleration value falls within the second range, and (iii) the period of the change in acceleration value stably falls within the given fluctuation range, it is determined that the user is traveling by walking. This makes it possible to appropriately detect that the user has shifted his/her traveling from traveling by using a traveling means other than walking to traveling by walking. It is therefore possible to switch the acceleration value change period range between the first range and the second range at an appropriate time.

The electronic device in accordance with a fifth aspect of the present invention can be configured such that, in any one of the first through fourth aspects of the present invention, the determining section determines whether the user is traveling by walking, traveling by using a vehicle, or not traveling, based on (i) change in acceleration value supplied from the acceleration sensor and (ii) a fluctuation pattern of the acceleration value.

A method of controlling each of the electronic devices 1 and 1a in accordance with a sixth aspect of the present invention includes the steps of: (a) determining whether a user is walking or using a traveling means other than walking (S101, S201); and (b) counting the number of steps taken by the user in a case where (i) an amplitude of change in acceleration value supplied from an acceleration sensor 31 is not smaller than a given value and (ii) a period of the change in acceleration value falls within a first range (S102 through S105), in the step (b), the given range being switched between acceleration value change period ranges for counting the number of steps, depending on whether it is determined in the step (a) that the user is walking or that the user is using a traveling means other than walking. This configuration yields an effect similar to that brought about by the first aspect of the present invention.

The electronic device in accordance with each aspect of the present invention may be realized by a computer. In this case, the present invention encompasses: a control program for the electronic device which program causes a computer to operate as each section (software element) of the electronic device so that the electronic device can be realized by the computer, and a computer-readable storage medium storing therein the control program.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention is applicable to, for example, an electronic device which counts the number of steps taken by a user while the user is walking.

REFERENCE SIGNS LIST 1, 1a: Electronic device
11: Traveling means determining section
12: Range switching section (step counting section)
13: Counting section (step counting section)
14: Traveling means change detecting section (change detecting section)
31: Acceleration sensor
41: Acceleration value log (recording section)
S101, S201: Determination step
S102 through 105, S202 through S205: Step of counting the number of steps

The invention claimed is:
1. An electronic device, comprising:
a determining section configured to determine whether a user is walking or using a traveling means other than walking;
a step counting section configured to count a number of steps taken by the user in a case where (i) an amplitude of change in acceleration value supplied from an acceleration sensor is not smaller than a given value and (ii) a period of the change in acceleration value falls within a given range,
the step counting section switching the given range between acceleration value change period ranges for counting the number of steps, depending on whether the determining section determines that the user is walking or that the user is using a traveling means other than walking;
a recording section configured to record the period of the change in acceleration value;
a first range and a second range being different in extent from each other,
the first range being one of the acceleration value change period ranges for counting the number of steps, which one is used to count the number of steps in a case where it is determined that the user is walking,
the second range being the other one of the acceleration value change period ranges for counting the number of steps, which other one is used to count the number of steps in a case where it is determined that the user is using a traveling means other than walking,
in a case where the determining section determines that the user is using a traveling means other than walking, the step counting section (a) comparing, with a given fluctuation range, a fluctuation of the period of change in acceleration value at a current time point, which period at the current time point falls within the second range, the given fluctuation range being set, for counting the number of steps, to a range associated with the traveling means of the user and (b) comparing, with the given fluctuation range, a fluctuation of the period of change in acceleration value at a past time point, which period at the past time point is recorded in the recording section and falls within the second range,
in a case where (i) the period of change in acceleration value at the past time point fluctuated beyond the given fluctuation range, and (ii) the fluctuation of the period of change in acceleration value at the current time point falls both (a) within the given fluctuation range and (b) within 200 msec above or below an average of periods of change in acceleration value observed for the current traveling means, the step counting section counting the number of steps at the current time point.

2. The electronic device as set forth in claim 1, further comprising:
a change detecting section configured to detect change in traveling means,
in a case where the determining section determines that the user is using a traveling means other than walking, the change detecting section (a) comparing, with the given fluctuation range, the fluctuation of the period of change in acceleration value at the current time point, which period at the current time point falls within the second range, and (b) comparing, with the given fluctuation range, the fluctuation of the period of change in acceleration value at the past time point, which period at the past time point is recorded in the recording section and falls within the second range,
in a case where (i) the period of change in acceleration value at the past time point fluctuated beyond the given fluctuation range and (ii) the fluctuation of the period of change in acceleration at the current time point falls both (a) within the given fluctuation range and (b) within 200 msec above or below the average of periods of change in acceleration value observed for the current traveling means, the change detecting section determining that, during a period from the past time point to the current time point, the user shifted from traveling by a traveling means other than walking to traveling by walking.

3. The electronic device as set forth in claim 1, wherein:
the determining section determines whether the user is traveling by walking, traveling by using a vehicle, or not traveling, based on (i) change in acceleration value supplied from the acceleration sensor and (ii) a fluctuation pattern of the acceleration value.

4. A non-transitory computer-readable storage medium storing a control program for causing a computer to function as an electronic device as set forth in claim 1, the control program causing the computer to function as each of the determining section and the step counting section.

5.
A method of controlling an electronic device, comprising the steps of:
(a) determining whether a user is walking or using a traveling means other than walking;
(b) counting the number of steps taken by the user in a case where (i) an amplitude of change in acceleration value supplied from an acceleration sensor is not smaller than a given value and (ii) a period of the change in acceleration value falls within a given range,
in the step (b), the given range being switched between acceleration value change period ranges for counting the number of steps, depending on whether it is determined in the step (a) that the user is walking or that the user is using a traveling means other than walking, a first range and a second range being different in extent from each other, the first range being one of the acceleration value change period ranges for counting the number of steps, which one is used to count the number of steps in a case where it is determined that the user is walking, the second range being the other one of the acceleration value change period ranges for counting the number of steps, which other one is used to count the number of steps in a case where it is determined that the user is using a traveling means other than walking; and (c) recording the period of the change in acceleration value, in a case where it is determined that the user is using a traveling means other than walking, in the step (b), (I) comparing, with a given fluctuation range a fluctuation of the period of change in acceleration value at a current time point, which period at the current time point falls within the second range, the given fluctuation range being set, for counting the number of steps, to a range associated with the traveling means of the user, and (II) comparing, with the given fluctuation range, a fluctuation of the period of change in acceleration value at a past time point, which period at the past time point is recorded and falls within the second range, in a case where (i) the period of change in acceleration value at the past time point fluctuated beyond the given fluctuation range and (ii) the fluctuation of the period of change in acceleration value at the current time point falls both (a) within the given fluctuation range and (b) within 200 msec above or below an average of periods of change in acceleration value observed for the current traveling means to 200 msec below the average of the given fluctuation period of change in acceleration value, counting the number of steps at the current time point.

\* \* \* \* \*